April 22, 1924.
G. G. SKELTON
EGG CANDLER
Filed June 20, 1921
1,491,557
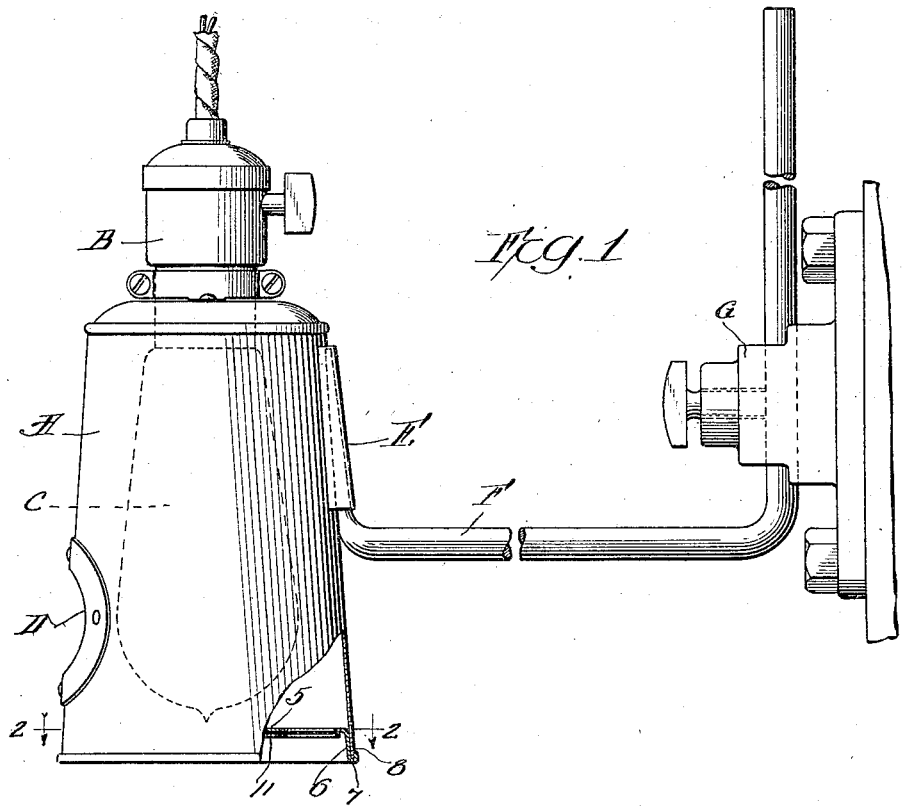
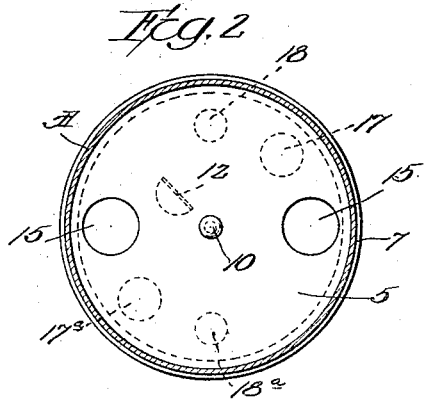
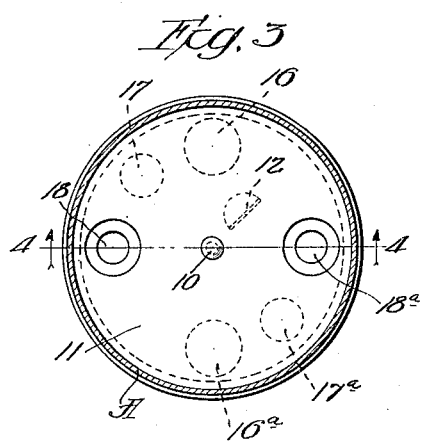
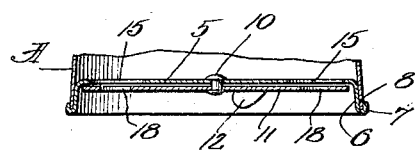
Inventor:
George G. Skelton Patented Apr. 22, 1924.

1,491,557

UNITED STATES PATENT OFFICE.

GEORGE G. SKELTON, OF CLINTON, IOWA, ASSIGNOR TO THE COLLIS COMPANY, OF CLINTON, IOWA, A CORPORATION OF IOWA.

EGG CANDLER.

Application filed June 20, 1921. Serial No. 479,087.

*To all whom it may concern:*

Be it known that I, GEORGE G. SKELTON, a citizen of the United States, residing at Clinton, in the county of Clinton and State of Iowa, have invented certain new and useful Improvements in Egg Candlers, of which the following is a specification.

This invention relates to a device for candling eggs, and is concerned primarily with certain features of construction by which the working light may be varied as desired.

In the drawing is shown an exemplification of this invention in the manner following:

Figure 1 is a side elevation of the candling device;

Fig. 2 is a transverse section therethrough on line 2—2 of Fig. 1;

Fig. 3 is a similar view with the parts adjusted to obtain a lesser working light; and Fig. 4 is a fragmentary sectional view taken on line 4—4 of Fig. 3.

The device in its entirety, as shown in Fig. 1, includes a generally cylindrical casing A with which is connected a socket B for an electric light C that lies within the casing, the walls thereof being provided with an opening D through which the light shines upon an egg to be tested. Exteriorly of the casing is a strap E for receiving the end of an arm F which is adjustably carried by a bracket G that may be mounted upon a wall or other fixed support. The construction just described is in its general aspects common to this art, and provides a mounting for the candler which permits it to be swung to working position over an egg case at a desired height therefrom.

The parts which are special to this invention are located in the bottom end of the casing and are designed to provide one or more openings of variable size through which a desired amount of working light may shine upon an egg case which is positioned beneath the candler. As shown in the drawing, the casing is provided with a bottom 5 which is formed with a depending marginal flange 6 which extends downwardly to bend as at 7 around the lower edge 8 of the casing wall, thereby providing a light tight joint. The bottom 5, which occupies a position that is an appreciable distance from the lower edge of the casing, is circular to conform with the periphery of the casing, and is provided in its center with a pin 10 forming a pivotal mounting for a circular disk 11 which underlies the bottom, the pin being preferably upset at either end to connect the disk inseparably, but rotatably, to the bottom. To facilitate rotation of the disk a tongue 12 is struck out from its body to depend downwardly in the manner best shown in Fig. 4.

The casing bottom, as appears best in Fig. 2, is provided with one or more openings 15, the preferred number being two. These openings are arranged on diametrically opposite sides of the bottom, as shown. In co-operative relation to these openings are two groups of other openings 16, 17, and 18, and 16$^a$, 17$^a$, and 18$^a$, all formed in the disk 11, the two groups being arranged on diametrically opposite sides of the disk. Three openings forming each group are the preferred number, their spacing being shown as 45° apart, so as to leave two blank spaces of considerable size between each group. All of these openings are located at an equal distance from the center of the disk.

By following the construction described, it is possible to rotate the disk 11 to cover the openings 15 by the blank spaces which lie between the two groups of openings in the disk, thus shutting off all working light which would otherwise shine down into the egg case therebelow. The openings in the casing bottom are preferably of maximum size as compared with the others which have been described. The openings 16 and 16$^a$ may likewise be of the same size, so that when registered with the bottom openings, the amount of light admitted to shine on the egg case will not be reduced. The other openings 17 and 18, as well as the openings 17$^a$ and 18$^a$ are graduated in size so as to be progressively smaller than the openings 16 and 16$^a$, whereby they may serve to reduce the amount of light that is permitted to shine into the egg case. It will accordingly be noted that I have provided a means that is readily manipulated for varying the area of openings through which the light shines, thereby adapting the device to whatever may be the requirements of the user.

It is further to be noted that the light which is admitted through the bottom of the candler passes therethrough at different points, instead of through a single opening. This is advantageous in that the light is somewhat diffused, and shines over a greater space within the egg case than would otherwise be possible. By means such as this, the candling room may be kept dark, while at the same time enough light is admitted into the egg case to take bench counts, or to detect eggs which are stained.

I claim:

An egg candler comprising a tubular casing having an egg candling aperture and provided with means at one end for detachably securing said casing to a lamp socket, an apertured closure for the other end of said casing mounted within the walls of said tubular casing, and a shutter formed with apertures adapted to register with the apertures in said closure and operatively connected to said closure.

GEO. G. SKELTON.

Witness:
C. M. WEAKS.